March 3, 1970   F. A. DE TOLEDO ET AL   3,498,263
APPARATUS FOR COATING CONTINUOUSLY PRODUCED FILAMENTS
Filed April 12, 1968   4 Sheets-Sheet 1

FERNANDO ALVAREZ DE TOLEDO &
LÉON E. CHARLIER
INVENTORS

BY
Staelin + Overman
ATTORNEYS

FERNANDO ALVAREZ DE TOLEDO &
LÉON E. CHARLIER
INVENTORS

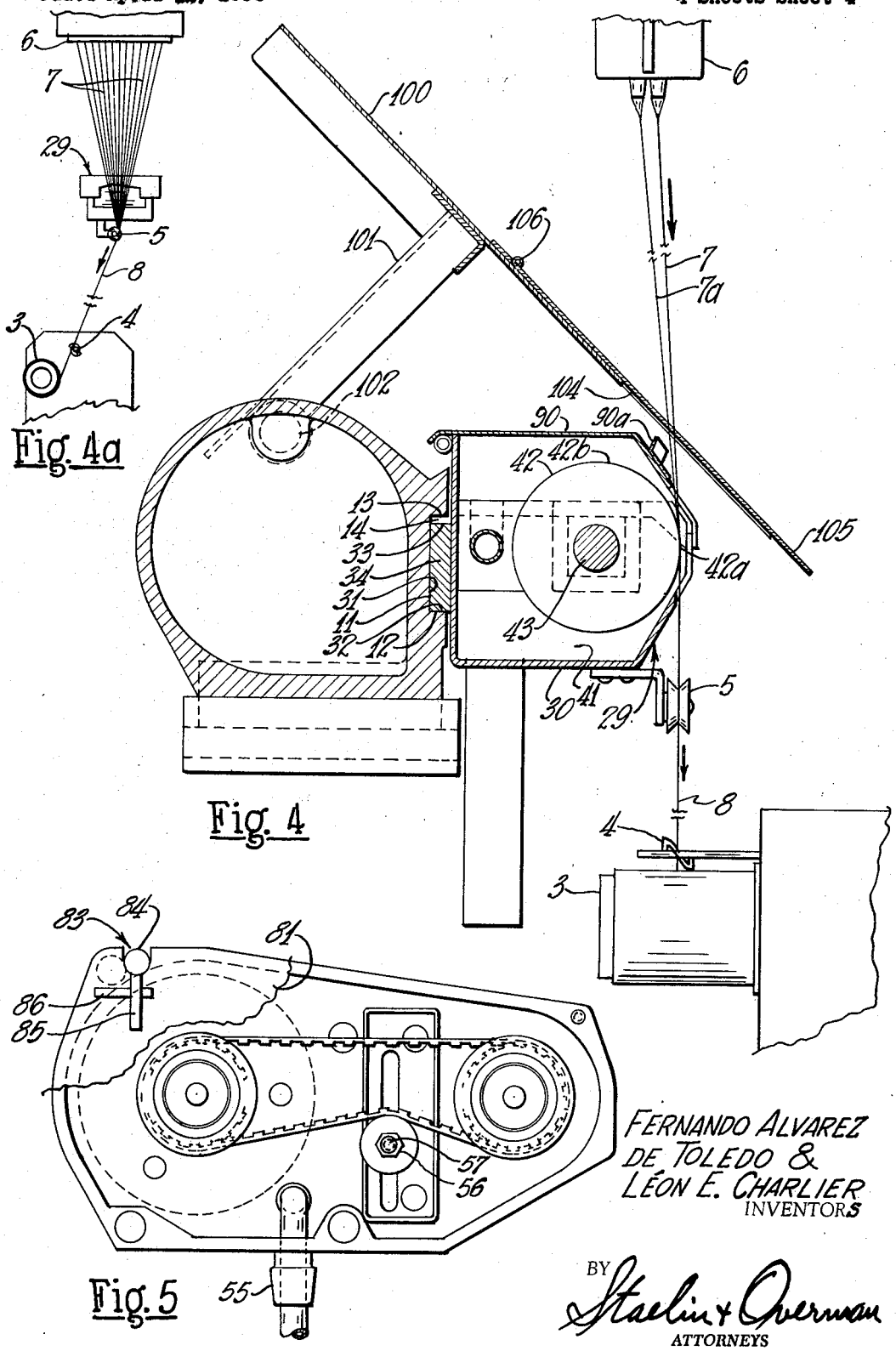

United States Patent Office 3,498,263
Patented Mar. 3, 1970

3,498,263
APPARATUS FOR COATING CONTINUOUSLY
PRODUCED FILAMENTS
Fernando Alvarez de Toledo, Battice, and Leon E.
Charlier, Thimister, Belgium, assignors to Owens-
Corning Fiberglas Corporation, a corporation of
Delaware
Filed Apr. 12, 1968, Ser. No. 720,759
Int. Cl. B05c 1/06
U.S. Cl. 118—234                29 Claims

ABSTRACT OF THE DISCLOSURE

Coating apparatus for continuous filaments comprising a support frame unit, a coating unit, and means for removably securing said coating unit to said support frame. One of the support frame and coating units has a guide bar element with two alignment surfaces formed thereon. The other of the support frame coating units has a reference groove formed therein to receive the guide bar element, the groove having two alignment surfaces. The alignment surfaces of the guide bar element and the groove, when brought into mutually abutting engagement, cooperate to vertically and horizontally position the coating unit to apply coating to the filamentary material. The support frame and coating unit may each have third alignment surfaces formed thereon which cooperate, when brought into mutually abutting engagement, to position the coating unit in a predetermined lateral alignment with respect to the filamentary material.

---

In describing the instant invention it will be disclosed and illustrated in connection with the application of a coating material to a group of continuous glass filaments or fibers which are simultaneously produced and then laterally grouped together to form a continuous glass fiber strand. Continuous glass fiber strands in many commercial installations are produced by maintaining a supply of molten glass in a glass melter or bushing which has a plurality of minute orifices distributed over its bottom. A fine stream of glass flows through each of the orifices and the cooling streams are longitudinally drawn at high speeds to attenuate them into glass fibers. Commercial bushings usually have upwards of two hundred or more orifices or tips through each of which an individual filament is pulled and the filaments are combined by lateral association to form one or more strands at the fiber forming position. The two hundred or more orifices or tips are spaced over a considerable area and the filaments, therefore, extend in the shape of one or more fans, a fan for each row of orifices, leading from the rows of the spaced orifices to a guide or gathering shoe.

In order to insure the application of a size, lubricant, binder, or other coating to each of the filaments applicators of many different types have been devised which transfer the liquid coating material to the filaments before they are associated into a strand or at the time of their association together to form a strand. In order to insure that each of the two hundred or more filaments in the strand is individually coated it is preferable to apply the liquid coating to the filaments before they are associated together in strand form. Coating apparatus of this general type is known. While apparatus of this type has been generally satisfactory there have been difficulties in the areas of the belt or coating transfer means maintaining their alignment, removal and installation of belt means, entanglement problems from exposed rotating components, drainage of water shaken from the filamentary material, the down time consumed when it is necessary to clean or perform maintenance on the coating apparatus, and the difficulties in aligning the apparatus after maintenance or cleaning with the fan of filamentary material to insure an even application of coating to each filament. The last problem is particularly acute, since in a normal installation the contact line of a coating transfer means must be held within a one-third inch range for optimum filament coating and fiber and strand tension.

This invention therefore has as its primary object the provision of improved means or apparatus for coating filaments or fibers, particularly for applying a liquid coating to each of individual filaments prior to their association into a strand.

It is a further object of this invention to provide an improved apparatus for applying coating to a group of continuous filaments, which apparatus may have coating units which are interchangeable and alignable with no tools and with a minimum of down time involved.

A still further object of this invention is to provide improved apparatus for applying a liquid coating to a group of continuous filaments which prevents water dilution of the liquid coating being applied, reduces entanglements problems caused from exposed rotating exponents, and generally provides more satisfactory and efficient service.

The invention features apparatus for the above-described purposes which includes a support frame unit including means for securing the frame in a predetermined anchored positon with respect to the path of the filamentary material, a coating unit including a housing having a coating supply tank formed therein and a coating transfer means supported in said housing for transferring liquid coating from the supply tank to the filamentary material, and means for removably securing the coating unit to the support frame. One of the support frame and coating units has a guide bar element with two alignment surfaces formed thereon. The other of the support frame and coating units has a reference groove formed therein to receive the guide bar element, the groove having two alignment surfaces. The alignment surfaces of the guide bar element and the groove, when brought into mutually abutting engagement, cooperate to vertically and horizontally position the coating transfer means to apply coating to individual filaments. The support frame and coating unit may each have third alignment surfaces formed thereon to cooperate, when brought into mutually abutting engagement, to position the coating transfer means laterally with respect to the path of the filamentary material.

The guide bar element advantageously carries a stud extending from one of the alignment surfaces thereon toward the corresponding alignment surface of the groove. The unit with the groove formed therein has a slot formed through the corresponding alignment surface to receive the stud. Fastener means for the stud are utilized to maintain the stud carrying and corresponding alignment surfaces in abutting relationship. The groove advantageously slidably receives the guide bar element and the slot slidably receives the stud. A retaining bar means may be secured adjacent to and extending across an end of the groove remote from the end having the slot formed therethrough. An end of the guide bar element advantageously extends into the retaining closure formed by the retaining bar and the groove to cooperate with the stud and fastener means to hold the coating unit in place.

The retaining bar may have formed thereon the third alignment surface for the support frame unit to mate with the third alignment surface formed on the coating unit. The third alignment surfaces are in registration when the guide bar is disposed in the groove. The fastener means advantageously includes nut means for the stud and spring means for disposition on the stud below the nut means to permit finger tightening of the nut means to hold the units together and prevent the nut means from vibrating loose. The relative location of the stud and fastener means with respect to the length of the slot prevents the disengagement of the guide bar element from the groove by any motion except the sliding of the bar in the groove until the other end of the bar has been removed from the retaining closure.

The housing means includes a cover having a downwardly inclined portion with an access opening formed therein to permit contact between a fan of filmentary material and the coating transfer means. The access opening has a rear wall above the transfer means, the rear wall having first and second sections of unequal length forming an obtuse angle at the junction thereof with the apex of the angle pointing away from the coating transfer means. The first and second sections thus create slopes along which moisture collecting on the cover will drain to the sides of the access opening and away from the coating transfer means, the slopes preventing the accumulation of sufficient quantities of moisture on the rear wall to drip on the coating transfer means.

The apparatus further includes housing means formed on the support frame unit for mounting a motor therein and a power translating unit means for connecting a drive motor to rotate the coating transfer means. The support frame and the translating unit have mating alignment surfaces to position the translating unit to connect the motor to drive the coating transfer means. The translating unit advantageously includes an enclosure to isolate the translating means from the coating unit and fan of fibers. A translating drive shaft extends from the enclosure and is coupled to a transfer drive shaft extending from the coating unit. The coupling means advantageously comprises a tongue on one of the shafts and a tongue receiving groove formed on the other of the shafts.

Other objects, advantages, and features of the invention will become apparent when the following description is taken in conjunction with the accompanying drawings, in which:

FIGURE 4 is a side view of the apparatus illustrated in FIGURE 2 with a section taken at lines 4—4 in FIGURE 2;

FIGURE 4a is a front elevational view of a fiber forming station utilizing the teachings of this invention; and FIGURE 5 is a side elevational view of the power translating unit and housing enclosing same.

Figure 1:
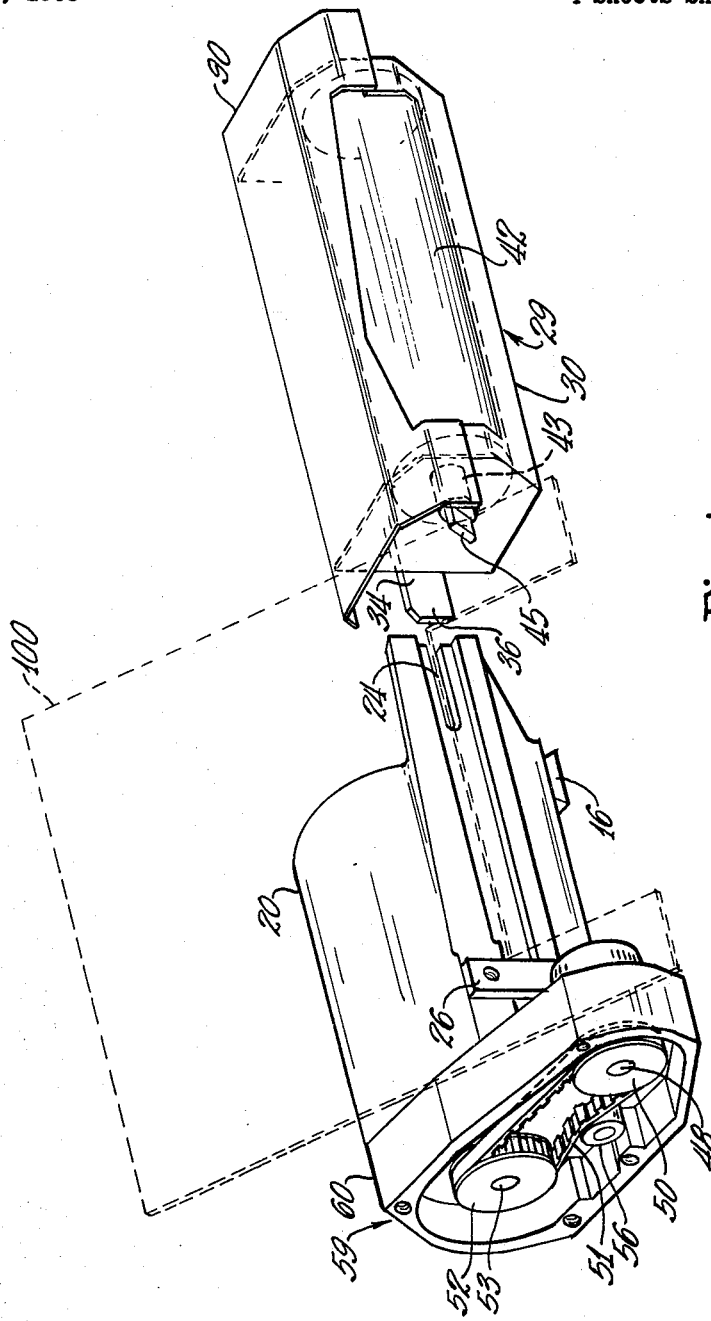
FIGURE 1 is a view in perspective of apparatus embodying the teachings of this invention in which the support frame unit including a motor housing and the translating unit are shown in their connected position while the coating unit is shown in the separated position and ready for assembly with and in alignment on the support frame.

As noted in FIGURES 4 and 4a a multifilament, continuous glass fiber strand 8 may be formed from fans 7 and 7a which include a plurality of individual fibers attenuated from fine streams of molten glass which flow through a corresponding number of orifices in the bottom of a glass feeder, melter or bushing 6. The fibers or filaments of the fans 7 and 7a extend in a lateral row as seen in FIGURE 4a because of the necessity for laterally spacing the individual orifices from which they are pulled. In order to associate the plurality of individual filaments to form a multifilament strand 8 they are led through a guide or gathering shoe 5. After association of the filaments in fans 7 and 7a to form the strand 8 the strand may be led downwardly through a traverse means 4 and onto the exterior of a rotary collector spool 3 for winding the continuous strand to form a package of strand from which it can subsequently be unwound by conventional textile or other machinery.

In order to insure the application of the size, lubricant, binder, or other coating to each of the filaments the coating unit 29 must be disposed intermediate the fiber forming location upstream and strand gathering location downstream in order to transfer the liquid coating material to the filaments 7 before they are associated into a strand 8. The individual fibers thus form fiber fans or planes 7 and 7a (best seen in FIGURE 4), the fans extending transversely across the coating transfer surface 42b of transfer means 42 of the coating unit 29.

While only one fan or plane of fibers 7 is discussed in detail hereafter, it will be appreciated that a plurality of fiber fans such as shown at 7 and 7a in FIGURE 4 may be guided over the coating transfer means after their formation from a plurality of lateral rows of laterally spaced individual orifices.

The coating unit 29 includes a housing 30 having a coating supply tank 41 formed therein and a coating transfer means 42, in this instance a roller, carried on a roller shaft 43 which is journally supported on bearings 44 in the housing 30.

The liquid coating material is supplied to the local supply tank 41 through a binder inlet conduit 71 having inlet orifices 72 formed therein. Excess or circulating binder is removed from the tank 41 via the exit conduit 70. Removably securable hose type connections may be utilized to connect a circulating supply of binder to the inlet and exit conduits 71, 70.

A support frame unit is indicated generally at 9 and includes a support frame foot 16 which is adapted to be slidably positioned in a dove-tail foot groove 17 formed in a support frame anchor element 18. Set screws 19 hold the foot 16 in a predetermined position in groove 17. The anchor element is secured in a predetermined position by any suitable means known to the art such as flange and bolt assemblies so that when the support frame unit and coating unit are in an assembled position the coating transfer means 42 is properly located to best apply a coating to each of the fibers 7 in the fiber fan.

The support frame has first and second alignment surfaces 11, 12 formed thereon. The coating unit 29 has corresponding first and second alignment surfaces 31, 32 formed thereon. It can be seen (FIGURE 4) that the first surfaces and second surfaces cooperate, when brought respectively into mutually abutting engagement, to position the contact line 42a of the transfer surface 42b of the coating transfer means 42 in the plane of the fan of fibers 7. The first surfaces 11, 31 cooperate to determine the alignment in a horizontal direction of the transfer surface line 42a and thus of the coating unit 29. The second surfaces 12, 32 cooperate to determine the vertical alignment of the contact line 42a and thus of the coating unit 29.

Thus one of the support frame and coating units, in this instance the coating unit, has a guide bar element 34 with two intersecting alignment surfaces 31, 32 formed thereon, a third intersecting surface 33 defining the upper portion of the guide bar element 34. The other of the support frame and coating units, in the drawings shown as the support frame unit, has a reference groove 14 formed therein to receive the guide bar element 34, the groove having two alignment surfaces 11, 12, a third surface 13 completing the definition of the groove in the support frame unit. The alignment surfaces 12, 32 and 11, 31 of the guide bar element 34 and the groove 14, when brought into mutually abutting engagement, cooperate to vertically and horizontally position the coating transfer means 42 to apply coating to the plane of filaments defined by the fan of fibers 7.

The first and second alignment surfaces of the coating unit intersect to form a shoulder while the first and second alignment surfaces of the support frame intersect to form an angular recess to slidably receive the shoulder element.

Figure 3:
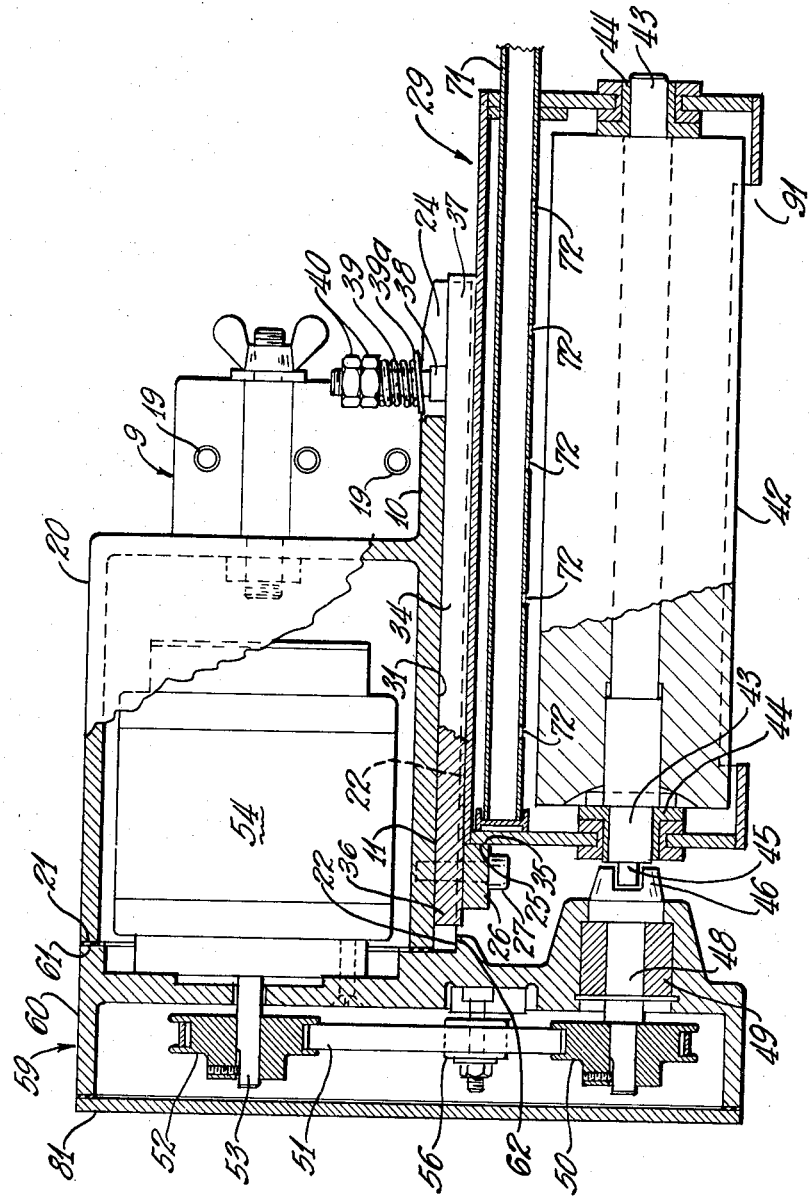
FIGURE 3 is a plan view of the apparatus illustrated in FIGURE 2 with a section taken along lines 3—3 of FIGURE 2.

Means are provided for removably securing the coating unit to the support frame unit. Stud 38 extends from one of the alignment surfaces, in this instance surface 31 of the guide bar element 34, toward the alignment surface 11 abutting the stud surface 31. An extension beam 10 of the support frame 9 has a slot 24 formed in the right end thereof to slidably receive the stud 38. Fastening means for the stud 38 include nut means 40, which may be the double nut locking arrangement illustrated in FIGURE 3, a thumb screw or wing nut, to be screwed upon screw threads formed on stud means 38. Resilient biasing means such as spring 39 on the stud means intermediate the nut means 40 and the beam 10 is retained in place by the nut means 40 and a washer 39a.

Thus the guide bar element 34 carries a stud 38 extending from alignment surface 31 toward the corresponding alignment surface 11 of the groove 14. The slot 24 slidably receives the stud 38 and fastener means 40 on the stud 38 maintains the stud carrying and the corresponding alignment surfaces in abutting relationship.

A retaining bar means 26 is secured, adjacent to and extending across an end of the groove 14 remote from the end having the slot 24 formed therethrough, by bolts 27. An end 36 of the guide bar 34, remote from the stud carrying end 37 thereof, extends into a retaining closure formed by the retaining bar 26 and the groove 14 to cooperate with the stud 38 and fastener means 40 to hold the coating unit 29 in place.

The retaining bar advantageously has a third alignment surface 25 formed thereon. The coating unit has a third alignment surface 35 formed on the left end of the housing 30 to mate with surface 25 on the retaining bar 26. The third alignment surfaces 25, 35 are in registration when the guide bar element 34 is disposed in the groove 14, the third alignment surfaces cooperating to position the coating unit 29 in a predetermined lateral alignment with the filamentary material 7. That is, the third alignment surfaces 25, 35 cooperate, when brought into mutually abutting engagement, to position the transfer surface or contact line 42a in a predetermined lateral alignment in the plane defined by the fiber fan.

It will be noted that the relative location of the stud 38 on end 37 of bar 34 and fastener means 40 with respect to the length of the slot 24 prevents the disengagement of the guide bar element 34 from the groove 14 by any motion except the sliding of the bar 34 in the groove 14 until the other end 36 of bar 34 has been removed from the retaining closure. This prevents any forward pull on the coating unit 29 which would tend to disturb the retaining bar 26 or the alignment surfaces 25 thereon and also prevents any bending of the tongue end 36 which would prevent future placement of the tongue end 36 of the guide bar 34 in the retaining closure. It is also to be noted that the resilient biasing means or spring 39 permits finger tightening of the nut means 40 to a sufficient holding force to secure the coating units 29 and support frame 10 together, in cooperation with the tongue 36 in retaining closure. This arrangement prevents the nut means 40 from vibrating loose yet allows the interchanging of coating unit 29 by an operator without the use of any tools.

It is to be further noted that while the coating transfer means 42 is shown herein as comprising a roller journally supported in the housing 30 to contact a coating supply in the tank, that other forms of coating a transfer means are intended to be covered by this invention. For example, a coating transfer means may comprise an endless belt means journally supported for continuous rotary travel between the coating supply tank and the filament fan. Further, it is contemplated that a coating transfer means may be utilized in which felt or other porous means may be retained within housing 30 to supply liquid coating, the protruding edge of the felt material defining a line in the plane of the fan of fibers 7.

The housing 30 includes a cover 90 having a downwardly inclined portion 90a in which an access opening 91 has been formed to permit contact between the fan of fibers 7 and the coating transfer means 42. The access opening has side walls 92, 93 and a back or rear wall 94. The rear wall 94 has a first section 95 and a second section 96 of unequal lengths forming an obtuse angle at the junction thereof with the apex 97 pointing away from the coating transfer means 42. Thus, slopes are created along which moisture collecting on the cover will drain to the sides of the access opening 91, the slope preventing the accumulation of sufficient quantities of moisture on the rear wall 94 to drip on the coating transfer means 42. The sections are of unequal length so that the angles formed by each section with respect to a plane, intersecting the apex and perpendicular to the fan plane are unequal to encourage a drop of moisture to start moving away from the apex in one direction as they form.

In prior art applications a slope has been created which extended from one side wall to the other side wall. However, in order to make the slope steep enough to cause drainage before the collected moisture dripped on the transfer surface 42b too much area above the transfer surface was left open so that windage from the fiber fan slaps the binder away on the transfer surface 42b from the fiber fan 7. If the single slope were inclined at too gentle or small an angle from one side wall to the other then there was insufficient slope to cause the moisture to drain and the moisture would drop onto the transfer surface 42b diluting the coating material thereon. The use of two unequal slopes overcomes these difficulties.

The support frame unit 9 includes a drive motor housing 20 for mounting a motor 54 on the support frame. The housing 20 preferably completely encloses the motor 54 to isolate the motor from the apron belt or roller of the coating unit so binder, size, or other lubricant will not foul the motor nor will fibers become entangled therein.

A power translating unit in a translating housing 60 is operative to connect the drive motor 54 to rotate the coating transfer means 42 and includes a translating drive or pulley shaft 48 journally supported in pulley bearing 49 and carrying thereon a pulley or gear 50. A drive belt or chain 51 couples pulley 50 to a motor pulley or gear 52 mounted on motor shaft 53. An idler wheel 56 is journally supported on an idler shaft 57 which is vertically adjustable so that the idler wheel may be adjusted to take up the slack in the belt 51.

Figure 2:
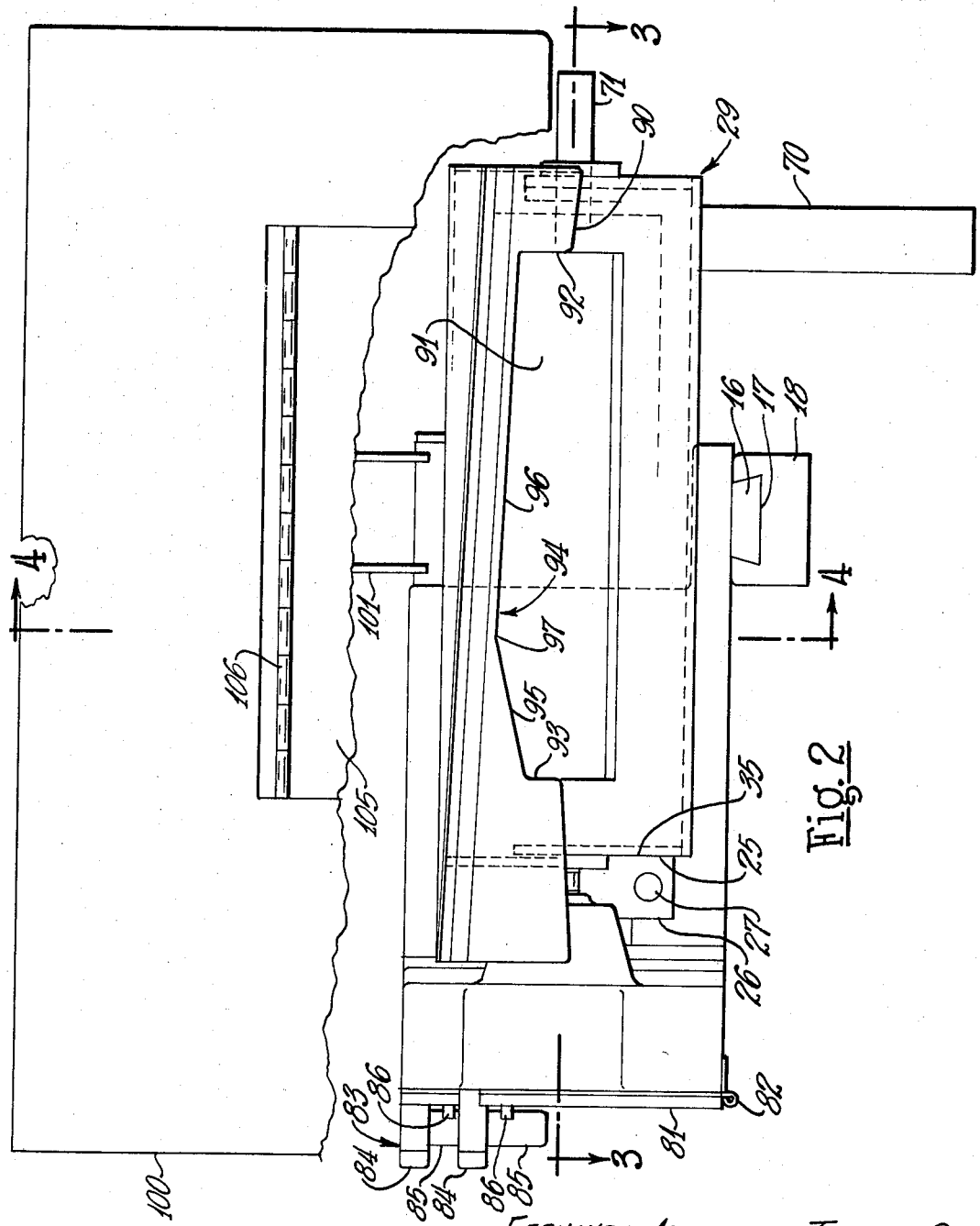
FIGURE 2 is a front elevational view of the apparatus of FIGURE 1 showing all units assembled.

The translating unit housing may be made completely enclosed by the use of an end plate 81 which is supported by a hinge arrangement 82 for rotation into a closed position as shown in FIGURE 2. As shown in FIGURES 2 and 5, twist fasteners 83 each include a pivotal shaft 84 and a depending arm 85 which, when rotated into fastening position, engages wedge surfaces 86 formed on end plate 81. The translating or connecting unit is thus also isolated since it is completely enclosed from the binder, glass, resin, etc., so that the drive mechanism generally is not fouled. A conduit 55 extends through housing 60 to permit power leads to be connected to motor 54.

The translating drive or pulley shaft 48 extends from the housing 60 toward the roller shaft 43. Coupling means comprising a tongue or male coupling 45 formed on the drive shaft 43 and a tongue receiving groove or female coupling 46 formed on the shaft 48 permit the two shafts to be connected for rotation and disconnected for changing of coating units 29 without the use of tools and with little time involved.

The housing 60 of the translating unit indicated generally at 59 has first and second alignment surfaces 61, 62 formed thereon. The motor housing 20 and support frame 9 generally has fourth and fifth alignment surfaces 20, 21 formed thereon. The first and fourth alignment surfaces 61, 21 and the second and fifth alignment surfaces 62, 22 cooperate, when brought respectively in a mutually abutting engagement to position the translating unit in alignment for connecting the coating transfer means 42 to the drive motor 54 in the motor housing 20.

An applicator cover 100 to shield the entire unit is carried on a strut 101 which is pivotally mounted on shaft 102 extending from the motor housing 20 of the support frame unit 9. An access opening 104 is formed in the applicator cover 100. The opening 104 is closed by an access cover or visor 105 which is connected to the applicator cover 100 by hinge arrangement 106 so that the access cover may be rotated 180 degrees to put it out of position whenever the fiber forming station is in operation.

It is apparent that, within the scope of this invention, modifications and different arrangements may be made other than is herein disclosed, and the present disclosure is illustrative merely of the preferred embodiments, the invention comprehending all variations thereof.

We claim:

1. Apparatus for applying a coating to a fan of continuous filaments moving past said apparatus comprising a support frame unit adapted to be secured in a predetermined location with respect to the path of said fan; a coating unit including a coating transfer means having a transfer surface defining a line which must become a line of a plane defined by the path of said fan to transfer coating to each of the filaments in the fan plane from a supply of the coating; said support frame having first and second alignment surfaces formed thereon, said coating unit having corresponding first and second alignment surfaces formed thereon; said first surfaces and said second surfaces cooperating, when brought respectively into mutually abutting engagement, to position said transfer surface line in said fan plane; and means for removably securing said coating unit to said support frame.

2. Apparatus as defined in claim 1 in which said first surfaces cooperate to determine horizontal alignment of said transfer surface line.

3. Apparatus as defined in claim 1 in which said second surfaces cooperate to determine vertical alignment of said transfer surface line.

4. Apparatus as defined in claim 1 which said support frame and said coating unit each have third alignment surfaces formed thereon; said third surfaces cooperating, when brought into mutually abutting engagement, to position said transfer surface line in a predetermined lateral alignment in said fan plane.

5. Apparatus as defined in claim 1 in which said first and second surfaces of one of said support frame and coating units intersect to form a shoulder, the first and second surfaces of the other of said support frame and coating units intersecting to form an angular recess to slidably receive said shoulder element.

6. Apparatus as defined in claim 5 in which said removable securing means includes stud means extending from one of said surfaces, the surface abutting said stud surface having a slot formed therein to slidably receive said stud means, and fastening means for said stud for removably securing said stud surface to said abutting surface.

7. Apparatus as defined in claim 6 in which said stud means has screw threads formed thereon and in which said fastening means comprises nut means and which further includes resilient biasing means on said stud means intermediate said nut means and said abutting means.

8. Apparatus as defined in claim 1 in which said coating unit includes a housing having a coating supply tank formed therein.

9. Apparatus as defined in claim 8 in which said coating transfer means comprises a roller journally supported in said housing to contact a coating supply in said tank.

10. Apparatus as defined in claim 8 in which said coating transfer means comprises an endless belt means journally supported for continuous rotary travel between said coating supply tank and said filament fan.

11. Apparatus as defined in claim 8 in which said housing includes a cover having a downwardly inclined portion with an access opening formed therein to permit contact between said fan and said coating transfer means, said access opening having a rear wall above said transfer means, said rear wall having first and second sections of unequal length forming an obtuse angle at the junction thereof, thereby creating slopes along which moisture collecting on said cover will drain to the sides of the access opening, the slopes preventing the accumulation of sufficient quantities of moisture on the rear wall to drip on the coating transfer means.

12. Apparatus as defined in claim 1 in which said support frame unit includes a drive motor housing for isolating a drive motor from said coating unit and said fan.

13. Apparatus as defined in claim 12 which further includes power translating unit means for connecting a drive motor to rotate said coating transfer means.

14. Apparatus as defined in claim 13 in which said translating unit means has first and second alignment surfaces formed thereon and said support frame has fourth and fifth alignment surfaces formed thereon; said first and fourth and said second and fifth surfaces cooperating, when brought respectively into mutually abutting engagement, to position said translating unit in alignment for connecting said coating transfer means to a drive motor in said motor housing.

15. Apparatus as defined in claim 13 in which said power translating unit is enclosed to isolate the translating unit from said coating unit and said fan.

16. Apparatus as defined in claim 15 in which said translating unit includes a translating drive shaft extending from said unit enclosure and said coating unit includes a transfer drive shaft extending therefrom, and means for coupling said translating and said transfer drive shafts.

17. Apparatus as defined in claim 16 in which said coupling means comprises a tongue formed on one of said shafts and a tongue receiving groove formed in the other of said shafts.

18. Apparatus for applying a liquid coating to longitudinally moving continuous filamentary material comprising a support frame unit including means for securing said frame in a predetermined anchored position with respect to the path of said filamentary material; a coating unit including a housing having a coating supply tank formed therein and a coating transfer means supported in said housing for transferring liquid coating from said supply tank to said filamentary material; one of said support frame and coating units having a guide bar element with two alignment surfaces formed thereon; the other of said support frame and coating units having a reference groove formed therein to receive said guide bar element, the groove having two alignment surfaces; the alignment surfaces of the guide bar element and the groove, when brought into mutually abutting engagement, cooperating to vertically and horizontally position said coating transfer means to apply coating to said filamentary material; and means for removably securing said coating unit to said support frame.

19. Apparatus as defined in claim 18 in which said support frame and said coating unit each have third alignment surfaces formed thereon; said third surfaces cooperating, when brought into mutually abutting engagement, to position said coating transfer means laterally with respect to the path of said filamentary material.

20. Apparatus as defined in claim 18 in which said guide bar element carries a stud extending from one of the alignment surfaces thereon toward the corresponding alignment surface of said groove, said unit with the groove formed therein having a slot formed through said corresponding alignment surface to receive said stud, and fastener means for said stud operative to maintain said stud carrying and the corresponding alignment surface in abutting relationship.

21. Apparatus as defined in claim 20 in which said groove slidably receives said guide bar element and said slot slidably receives said stud, and which further includes retaining bar means secured adjacent to and extending across an end of said groove remote from an end having the slot formed therethrough, an end of said guide bar element extending into the retaining closure formed by said retaining bar and said groove to cooperate with said stud and fastener means to hold said coating unit in place.

22. Apparatus as defined in claim 21 in which said retaining bar has a third alignment surface formed thereon and said coating unit has a third alignment surface formed thereon; said third alignment surfaces being in registration when said guide bar is disposed in said groove; the third alignment surfaces cooperating to position said coating unit in a predetermined lateral alignment with said filamentary material.

23. Apparatus as defined in claim 22 in which said fastener means includes nut means for said stud and spring means for disposition on said stud below said nut means to permit finger tightening of said nut means to hold said units together and prevent said nut means from vibrating loose.

24. Apparatus as defined in claim 22 in which the relative location of said stud and fastener means with respect to the length of said slot prevents the disengagement of said guide bar element from said groove by any motion except the sliding of said bar in said groove until the other end of said bar has been removed from said retaining closure.

25. Apparatus as defined in claim 18 which further includes means for mounting a motor on said support frame and a power translating unit means for connecting a drive motor to rotate said coating transfer means, said support frame and said translating unit having mating alignment surfaces to position said translating unit to connect said motor to drive said coating transfer means.

26. Apparatus as defined in claim 25 in which said translating unit is enclosed to isolate the translating means from said coating unit and said fan.

27. Apparatus as defined in claim 25 in which said translating unit includes an enclosure to isolate the translating means from the coating unit and fan and a translating drive shaft extending from said enclosure, and in which said coating unit includes a transfer drive shaft extending therefrom, and means for coupling said translating and transfer drive shafts.

28. Apparatus as defined in claim 27 in which said coupling means comprises a tongue on one of said shafts and a tongue receiving groove formed in the other of said shafts.

29. Apparatus defined in claim 18 which further includes filament forming means comprising feeder means for supplying streams of molten glass from a plurality of orifices formed therein and means for attenuating said streams into filaments, said feeder means being disposed upstream from said coating transfer means and said attenuating means being disposed downstream from said coating transfer means so that said attenuated filaments are moved longitudinally past said coating transfer means.

References Cited
UNITED STATES PATENTS

| | | | |
|---|---|---|---|
| 3,331,353 | 7/1967 | Sears et al. | 118—257 |
| 3,335,046 | 8/1967 | Current et al. | 118—257 XR |
| 3,407,784 | 10/1968 | Hitt et al. | 118—234 |

WALTER A. SCHEEL, Primary Examiner

R. I. SMITH, Assistant Examiner

U.S. Cl. X.R.

118—256, 259